May 31, 1938.   F. W. PRICE   2,118,898
ROOFING MATERIAL AND METHOD OF MAKING THE SAME
Filed July 28, 1936
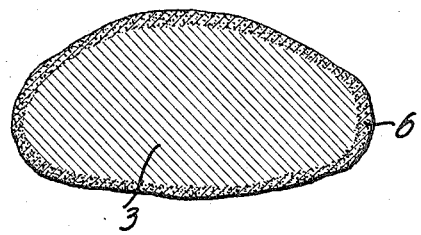
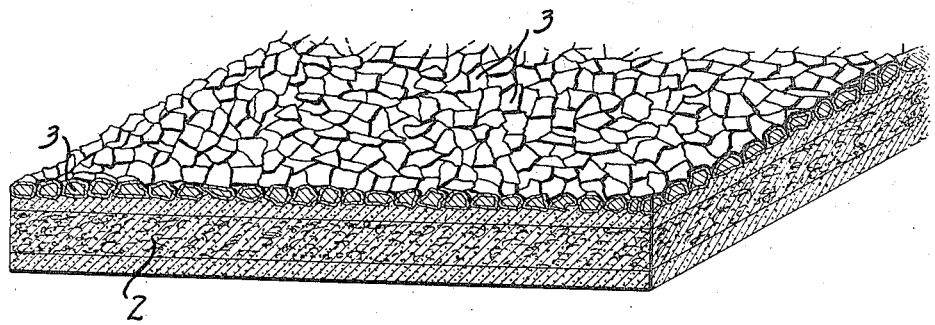
INVENTOR
FOREST W. PRICE
BY Charles S. Evans
HIS ATTORNEY Patented May 31, 1938

2,118,898

UNITED STATES PATENT OFFICE 2,118,898

ROOFING MATERIAL AND METHOD OF MAKING THE SAME

Forest W. Price, Richmond, Calif., assignor to Pacific Minerals Company, Ltd., Richmond, Calif., a corporation of Nevada Application July 28, 1936, Serial No. 93,015

9 Claims. (Cl. 91—70)

My invention relates to granular materials; and the broad object of my invention is to provide a protective coating for roofing granules which renders the latter more resistant to acids, moisture, heat and general weather conditions that cause fading, disintegration and weathering of roofing granules.

A further object of my invention is to provide a decorative roofing granule having a rich, bright coloring that does not fade out under exposure to the sun, rain and other adverse weather conditions.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a sectional view of a coated granule, many times enlarged, embodying the improvements of my invention; and Figure 2 is a perspective view showing a piece of my granule surfaced roofing material.

In terms of broad inclusion, the roofing material embodying my invention comprises granules treated with a solution of an organic silicate. In treating the granules the latter are preferably first cleaned and then coated with my solution. If desired, a pigment may be added to give color to the granules; and the pigment may either be applied to the granules before coating with the solution, or incorporated directly in the solution. After applying the coating material the granules may be heat treated, if desired, to further increase their weather resisting properties. The treated granules are then preferably applied as a surfacing to a base sheet, such as a bituminous saturated sheet, which sheet may be cut into shingles or supplied in rolls.

In greater detail, and referring to the drawing, the roofing material embodying my invention preferably comprises a bituminous saturated and/or coated felt base sheet 2 having a surfacing of granules 3. This granular surfaced sheet material may be cut into shingles, or the sheet material may be supplied in rolls for application in sheet form to a roof. It is to be understood that the character of the base sheet 2 may be varied within wide limits, the bituminous treated felt being preferred however in a composition type roofing embodying my invention. It is also understood that my improved surfacing granules may be applied to roofs after a base sheet has been laid; in fact, my granules may be applied by any of the methods used in the application of ordinary roofing granules. The application of the granules to a roofing sheet during the manufacture of the roofing material however is the preferred form of the invention.

The surfacing granules 3, as shown in the drawing, are provided with a protective silica coating 6. This protective coating is applied by treating the granules with a solution of an organic silicate. A solution of ethyl silicate has been used with good results, but solutions of other organic silicates of similar nature, including the ethyl poly silicates, may be used, such as tetraethyl, diethyl, methyltriethyl, dimethyldiethyl, and trimethylethyl silicate. A hydrolyzed solution of the organic silicate is preferably used, and is preferably prepared by mixing the organic silicate with suitable misciblizing and catalyzing agents, such as water, alcohol and hydrochloric acid, in the approximate proportions by volume of:

| | Parts |
|---|---|
| Organic silicate | 2 to 5 |
| Alcohol | 2 to 4 |
| Water | 1 to 2 |
| Hydrochloric acid | 0 to 1 |

The alcohol and water serve as misciblizing agents and provide a medium in which the ester will hydrolize, while the hydrochloric acid acts as a catalyzing agent and regulates the speed of hydrolysis. The proportioning of the ingredients may be varied within the above specified approximate limits to alter characteristics in the coating material, such as viscosity and speed of setting.

My coating may be applied to any of the granular materials or mineral granules usually employed for roof surfaces, such as crushed rock, slag or slate. In the preferred process, the rock or other material is first crushed and screened to desired size. The granules are then thoroughly cleaned of all dust and fine particles that would otherwise clog the pores of the granule surfaces. The granules are then placed in a suitable receptacle together with a sufficient amount of the solution to coat the granules, and the granules preferably agitated by suitable means to insure complete coating of the granule surfaces.

After the granules are coated they may be heat treated, if desired, as I have found such heating further increases the weather resisting properties of the coated granules. The heating may be done in a rotary kiln or other standard type of furnace.

If the natural color of the granules is desired, no pigment is employed in my treatment. A coloring material may be added however by applying a pigment in dry powdered state to the granules before the latter are coated with the solution. For example, a powdered pigment, such as chrome oxide or iron oxide, may be added to the granules in the receptacle and the granules agitated to distribute the pigment over the surfaces. After this step the solution is added and the granules again agitated to coat the surfaces. In this procedure up to 20 pounds of the powdered pigment is preferably used for each 2,000 pounds of granules being treated, the exact amount of pigment employed depending upon the kind of pigment used and the character of color desired in the final product. If desired, instead of adding the pigment separately, the latter may be incorporated directly into the coating solution before the solution is applied to the granules.

After the coating on the granules has dried the granules are ready for application as a roof surfacing material. When applied to a bituminous treated roofing sheet, as shown in the drawing, the granules are preferably united to the sheet by the upper layer of bitumen, in the usual manner.

Roofing granules when treated in accordance with my invention are protected against deteriorating agencies by the durable and resistant properties of the silica coating; and the granules are not affected by acid, moisture, heat and weather conditions normally causing disintegration and weathering of roofing granules. Furthermore the pigmented granules have a brightness and permanency of color which gives an exceptionally beatiful appearance to a roof. The rich color does not fade out under exposure to the elements, and the granules maintain their bright color even after years of service. This is due to the highly resistant character of the protective silica coating.

I claim:

1. A roofing material comprising granules, and a protective silica coating on the granules.

2. A roofing material comprising granules, a protective silica coating on the granules, and a pigment in the coating.

3. A roofing material comprising granules, a protective silica coating on the granules deposited from a solution of an organic silicate.

4. A roofing material comprising granules, a protective silica coating on the granules deposited from a hydrolyzed solution of an organic silicate.

5. The method of treating roofing granules, which comprises coating the granules with a pigmented solution of an organic silicate, and heating the coated granules.

6. The method of treating roofing granules, which comprises applying a pigment to the granules, and then coating the granules with a solution of an organic silicate.

7. The method of treating roofing granules, which comprises coating the granules with a solution of an organic silicate, and then heating the coated granules.

8. A roofing material comprising granules, and a silica coating on the granules deposited from a solution of the following ingredients in the approximate proportions by volume of:

| | Parts |
|---|---|
| Organic silicate | 2 to 5 |
| Alcohol | 2 to 4 |
| Water | 1 to 2 |
| Hydrochloric acid | 0 to 1 |

9. A roofing material comprising a layer of bituminous material, granules embedded in said layer, and a silica coating on the granules.

FOREST W. PRICE.